United States Patent [19]

Throckmorton et al.

[11] 4,168,374
[45] Sep. 18, 1979

[54] COPOLYMERIZATION OF CONJUGATED DIOLEFINS USING A CHROMIUM-CONTAINING CATALYST SYSTEM

[75] Inventors: Morford C. Throckmorton, Akron; Charles J. Suchma, North Royalton, both of Ohio

[73] Assignee: The Goodyear Tire & Rubber Company, Akron, Ohio

[21] Appl. No.: 893,904

[22] Filed: Apr. 5, 1978

[51] Int. Cl.$^2$ .................. C08F 4/78; C08F 236/04; C08F 236/06; C08F 236/08
[52] U.S. Cl. ..................................... 526/139; 526/137
[58] Field of Search ............................. 526/139, 137

[56] References Cited
U.S. PATENT DOCUMENTS
3,040,016  6/1962  Balas et al. ........................... 526/139

FOREIGN PATENT DOCUMENTS
48-6939  3/1973  Japan .

Primary Examiner—William F. Hamrock
Attorney, Agent, or Firm—J. Y. Clowney

[57] ABSTRACT

There is disclosed a method for copolymerizing cis-1,3-pentadiene and trans-1,3-pentadiene to prepare cis-1,4-polypentadienes. Other conjugated diolefins, including butadiene, isoprene, 2-ethyl-1,3-butadiene and 2-methyl-1,3-pentadiene also may be copolymerized with the cis-1,3-pentadiene isomer to prepare elastomeric copolymers. The polymerization catalyst is a ternary catalyst system comprising (A) a soluble chromium compound, (B) organometallic compounds such as a trihydrocarbylaluminum, and (C) a dihydrocarbyl hydrogen phosphite.

10 Claims, No Drawings

COPOLYMERIZATION OF CONJUGATED DIOLEFINS USING A CHROMIUM-CONTAINING CATALYST SYSTEM

BACKGROUND OF INVENTION

This invention relates particularly to a process for copolymerizing cis-1,3-pentadiene and trans-1,3-pentadiene to produce copolymers whose microstructure is uniquely and predominantly cis-1,4-polypentadiene.

Other conjugated diolefins, including 1,3-butadiene, isoprene, 2-ethyl-1,3-butadiene, 2-methyl-1,3-pentadiene and 4-methyl-1,3-pentadiene also may be copolymerized with the cis-1,3-pentadiene isomer to prepare elastomeric copolymers.

The process utilizes a ternary catalyst system consisting of (A) a soluble chromium compound, (B) organometallic compounds such as a trihydrocarbylaluminum, and (C) a dihydrocarbyl hydrogen phosphite.

1,3-pentadiene monomer exists in two forms, namely, as the cis- and the trans- isomers. Each monomeric unit when polymerized contains at least one asymmetric carbon atom. There theoretically are 11 possible stereoregular polypentadienes.

Although at least eight different coordination catalyst systems based upon transition metals will polymerize trans-1,3-pentadiene, only two of them will polymerize cis-1,3-pentadiene.

U.S. Pat. No. 4,048,418 describes a process for polymerizing cis-1,3-pentadiene, using an iron catalyst system, to produce a polymer analyzing 93 percent cis-1,4-polypentadiene and which has a largely isotactic crystalline configuration; but the same iron catalyst polymerizes trans-1,3-pentadiene to a syndiotactic trans-1,2-polypentadiene. It is reported in Journ. Polym. Sci. 51, 463 (1961) that a vanadium catalyst polymerizes both the cis- and the trans-1,3-pentadienes to isotactic trans-1,4-polypentadiene.

U.S. Pat. No. 3,300,467 describes the polymerization of trans-1,3-pentadiene to polymers analyzing 65 to 87 percent cis-1,4-polypentadiene while using a titanium catalyst; and it is reported in Europ. Polym. Journ. 9, 189 (1973) that the titanium catalyst will isomerize the cis-1,3-pentadiene to trans-1,3-pentadiene and then polymerize the trans- monomer to a polymer containing 65 to 70 percent cis-1,4-polypentadiene.

U.S. Pat. Nos. 3,429,940 and 3,804,913 describe processes using a ternary catalyst comprising a chromium compound, triethylaluminum and an alkyl halide, which oligomerize conjugated diolefins such as isoprene or piperylene to form cyclic trimers such as trimethylcyclododecatriene. U.S. Pat. No. 3,754,043 describes a process that produces liquid polypentadiene while utilizing chromium acetylacetonate, a trialkylaluminum and a Schiff base as a catalyst system. Japenese Pat. No. 73 06,939 [see Chem. Abs. 80, 4644 n (1974)] describes a process for polymerizing 1,3-butadiene to a polymer in which 95 percent of the unsaturation is 1,2-polybutadiene, while utilizing a ternary catalyst consisting of a chromium compound, an organoaluminum compound and a phosphoric acid ester. Japanese Pat. No. 73 64,178 [Chem.Abs. 80, 109590v (1974)] reports the preparation of 1,2-polybutadiene by polymerizing butadiene in the presence of hydrogen using as catalysts chromium acetylacetonate, dibutylphosphonate and triisobutylaluminum.

Thus, there is no prior art concerning the copolymerization of cis- and trans-1,3-pentadienes to produce predominantly cis-1,4-polypentadienes, nor is there any art that teaches the copolymerization of any conjugated diolefins with cis-1,3-pentadiene to produce solid elastomers which contain a majority of polymer having cis-1,4-configuration.

A process has been found which will copolymerize linear and mono- branched conjugated diolefins containing from 4 to 8 carbon atoms.

A process and a catalyst system has now been discovered which makes it possible for the first time to copolymerize a mixture of cis-and trans-1,3-pentadiene isomers to predominantly cis-1,4-polypentadienes. Each of these cis-1,4 polypentadiene copolymers has a single relatively low glass transition temperature which makes these copolymers suitable for use in tire carcass compounds. It is now possible to copolymerize the cis-and trans-1,3-pentadiene isomers which normally occur together in certain fractions of byproduct $C_5$-hydrocarbon distillates from petroleum refining or petrochemical processes to form useful elastomeric products.

The previous processes for polymerizing mixtures of 1,3-pentadiene isomers have several disadvantages. For example, most of the prior art processes only polymerize the trans-isomer to produce polymers having less than satisfactory physical properties.

SUMMARY OF THE INVENTION

The invention provides a method of copolymerizing cis-1,3-pentadiene and trans-1,3-pentadiene by subjecting said diolefins to a catalyst comprising (A) at least one soluble chromium compound selected from the group consisting of chromium salts of organic acids containing from 2 to 20 carbon atoms, organic complex compounds of chromium containing tridentate ligands, and π-bonded organo chromium compounds, (B) at least one organometallic compound selected from the group consisting of aluminum trialkyls, magnesium dialkyls and zinc dialkyls, and (C) at least one phosphite compound selected from tris(2-chloroethyl)phosphite and dialkyl hydrogen phosphites.

The invention also consists of copolymerizing cis-1,3-pentadiene with other conjugated diolefins from the group of butadiene, isoprene, 2-ethyl-1,3-butadiene and 2-methyl-1,3-pentadiene by contacting said diolefins with a catalyst comprising (A) at least one soluble chromium compound selected from the group consisting of chromium salts of organic acids containing from 2 to 20 carbon atoms, organic complex compounds of chromium containing tridentate ligands, and π-bonded organo chromium compounds, (B) at least one organometallic compound selected from the group consisting of aluminum trialkyls, magnesium dialkyls and zinc dialkyls, and (C) at least one phosphite compound selected from tris(2-chloroethyl)phosphite and dialkyl hydrogen phosphites.

DETAILED DESCRIPTION OF INVENTION

The soluble chromium compound employed in the practice of this invention may be the chromium salts of carboxylic acids containing from 2 to 20 carbon atoms. The organic complex compounds of chromium containing tridentate organic ligands are also suitable. Tridentate organic ligands have three positions to which a covalent or coordinate bond with the metal may be formed. Representative of such a chromium containing tridentate compound is chromium acetylacetonate. The π-bonded organo chromium compounds represented by tris(allyl)chromium, tris(methylallyl)chromium, tris(crotyl)chromium, π-cyclopentadiene chromium tricarbonyl and π-phenyl chromium tricarbonyl may also be employed.

The preferred soluble chromium compounds useful in the invention are the chromium salts of organic acids represented by chromium octanoate, chromium benzoate, chromium naphthenate, chromium neo-decanoate, chromium oxalate and chromium stearate. Of all the soluble chromium compounds, the most preferred are chromium naphthenate, chromium neo-decanoate and chromium octanoate.

The organometallic compounds employed in this invention are aluminum trialkyls or dialkylaluminum hydrides, representative examples of which are aluminum trimethyl, aluminum triethyl, aluminum tri-n-propyl, aluminum tri-n-butyl, aluminum triisobutyl, aluminum tripentyl, aluminum trihexyl, aluminum trioctyl, diethylaluminum hydride and diisobutylaluminum hydride and the like.

The dialkyl magnesium compounds useful in this invention may be represented by di-n-hexylmagnesium and n-butylethylmagnesium and the like.

The dialkyl zinc compounds may be represented by diethylzinc and dibutylzinc and the like.

The dialkyl hydrogen phosphites may be represented by the tautomeric structures:

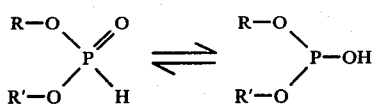

where R and R' indicate alkyl groups which may or may not be identical. The dialkyl phosphites exist substantially in the keto form (shown on the left) and are associated in dimeric or trimeric groupings by hydrogen bonding. The nomenclature dialkyl hydrogen phosphite, if applied strictly describes only the keto tautomer, but it commonly is applied to both tautomeric forms and that is the intent herein. The phosphites of this invention may be described further as having at least one phosphinic hydrogen atom.

The dialkyl hydrogen phosphites useful in the preparation of the catalyst of this invention are those containing from 1 to 20 carbon atoms in the alkyl groups. They may be represented by dimethyl hydrogen phosphite, diethyl hydrogen phosphite, diisopropyl hydrogen phosphite, dibutyl hydrogen phosphite, bis(2-ethylhexyl)hydrogen phosphite or dioctyl hydrogen phosphite, didodecyl hydrogen phosphite, dioctadecyl hydrogen phosphite, ethyl butyl hydrogen phosphite, methyl hexyl hydrogen phosphite and the like. Cycloalkyl hydrogen phosphites, such as dicyclohexyl hydrogen phosphite, also may be used; and monoalkyl-, monoaryl hydrogen phosphites, such as ethyl phenyl hydrogen phosphite and butyl benzyl hydrogen phosphite may also be utilized.

Tris(2-chloroethyl)phosphite is also useful in the invention.

The dialkyl hydrogen phosphites containing from 1 to 8 carbon atoms per alkyl group are the preferred phosphite containing compounds.

The catalyst system of the present invention has polymerization activity over a wide range of total catalyst concentration and catalyst component ratios. Catalyst components apparently interreact to form the active catalyst species. As a result, the optimum concentration for any one catalyst component is dependent upon the concentrations of the other catalyst components. While polymerizations will occur over a wide range of catalyst concentrations and ratios, the polymers having the most desirable properties are obtained within a narrower mole ratio range.

The molar ratio of the organometallic compound to the chromium compound (Me/Cr) can be varied from about 20:1 to about 2:1. However, a more preferred range of Me/Cr is from about 8:1 to about 4:1.

The molar ratio of the dialkyl or diaryl hydrogen phosphite to chromium compound (P/Cr) may be varied from about 0.2:1 to about 10:1 with a more preferred range of P/Cr being from about 0.5:1 to about 3:1.

Catalyst components may be charged to the polymerization system as separate catalyst components in either a step-wide or simultaneous manner, usually called the "in situ" preparation. The catalyst components may also be preformed by premixing each of the three components outside of the polymerization system and the resulting premixed catalyst components added to the polymerization systems.

The amount of total catalyst employed depends on such factors as purity of the components, polymerization rate desired, and the temperature. Therefore, specific total concentrations of catalyst cannot be set forth except to say that catalytic amounts should be employed. Successful polymerizations have been made using molar ratios of monomer to the chromium component in the ternary catalyst system ranging between about 300/1 to about 4,000/1. The preferred monomer to chromium concentration generally is between 600/1 and 2,000/1. Certain specific total catalyst concentration and catalyst component ratios which produce polymers having desired properties are illustrated in the examples elsewhere in the specification.

In general, the polymerizations of this invention are carried out in inert solvent systems and are, thus, considered to be solution polymerizations. By the term "inert solvent" is meant the solvent or diluent employed does not enter into the polymer structure nor does it have an adverse effect on the catalyst activity. Examples of such solvents are usually aliphatic, aromatic or cycloaliphatic hydrocarbons. The preferred solvents are hexane, pentane, benzene, toluene and cyclohexane. The solvent/monomer volume ratio may be varied over a wide range. Up to 20 or more/1 volume ratio of solvent to monomer may be employed. It is usually preferred to employ a solvent/monomer volume ratio of about 3/1 to about 6/1. It is possible to employ a suspension polymerization system in the practice of this invention. This may be done by choosing a solvent or diluent in which the polymer formed is insoluble.

It is usually desirable for best results to conduct polymerizations of this invention by employing air-free and moisture-free techniques.

Temperatures employed in the practice of this invention are not critical and may widely vary from a low temperature, for example, such as −10° C. or below to a high temperature of 100° C. or above. However, it is usually more desirable to employ a more convenient temperature between about 20° C. and about 90° C.

The practice of this invention is further illustrated by reference to the following examples which are intended to be representative rather than restrictive of the scope of the invention. Unless otherwise noted, all parts and percentages are by weight.

The dilute solution viscosities (DSV) of the polymers have been determined in toluene at 30° C. The glass transition temperatures ($T_g$) have been determined using DuPont's Models #900 and #990 Differential Thermal Analyzers (DTA). The microstructures of the polymers were determined by a combination of Nuclear Magnetic Resonance (NMR) and Infrared (IR) techniques as described by D. H. Beebe, et al., in Journ.Polym.Sci., Part A-1 (in press).

EXAMPLE I

Two separate solutions, one of cis- and the other of trans-1,3-pentadiene monomer, in hexane were prepared so that each solution contained 10 grams of 1,3-pentadiene per 100 ml of solution. The solutions were passed down separate columns of silica gel, and then aliquots of each solution were measured into a series of 4-oz bottles to prepare premixes containing a total of 10 grams of the cis- and transmonomers in different ratios ranging between 90:10 and 20:80 cis:trans-1,3-pentadienes. The catalyst components were charged by the "in situ" method in the following order: (a) trialkylaluminum, (b) chromium compound, and (c) dialkyl hydrogen phosphite. The specific compounds and the amounts of each, reported as millimoles per 100 grams of total monomers, are identified in columns 4, 5 and 6 in Table 1.

The bottles and their contents were placed in a water bath maintained at 50° C., and were tumbled end-over-end to provide agitation during polymerization. The polymerizations were terminated after the number of hours listed in column 7 in Table 1 by addition of 2 ml of methanol and 0.1 gram of dibutyl para-cresol. The polymers were isolated by drying under vacuum.

All of the polymers were rubbery solids. Each polymer exhibited only one glass transition temperature, although the Tg's for the series of polymers ranged between −59° C. and −47° C. depending upon the ratio of the two isomeric monomers in the charge.

EXAMPLE II

A purified solution of cis-1,3-pentadiene in n-pentane containing 10 g of 1,3-pentadiene per 100 ml of solution was prepared. A second purified solution in pentane containing 10 g of isoprene per 100 ml of solution also was prepared. Aliquots of these two solutions were measured into a series of 4-ounce bottles to prepare premixes containing a total of 10 grams of the two monomers in various ratios ranging between 90:10 and 25:75 cis-1,3-pentadiene:isoprene. The monomers then were copolymerized using the experimental procedure outlined in Example I. The catalyst charged to each bottle in this series was TEAL:Cr Octoate:(BuO)$_2$HPO=10:2:2 millimoles/100 grams of total monomer. The results are summarized in Table 2.

Table 2

| Run No | Monomer in Premix, % c-PD[1] | IP | Pzn. Time, Hours | Polymer Yield, Wt. % | DSV, dl/g | $T_g$[2], °C. |
|---|---|---|---|---|---|---|
| 1 | 100 | 0 | 1.5 | 91 | 6.0 | −56 |
| 2 | 90 | 10 | 27 | 41 | 1.4 | −55 |
| 3 | 75 | 25 | 27 | 39 | 1.1 | −48 |
| 4 | 50 | 50 | 27 | 45 | 1.4 | −40 |
| 5 | 25 | 75 | 21 | 67 | 1.9 | −34 |
| 6 | 0 | 100 | 20 | 93 | 2.8 | −23 |

[1]c-PD = cis-1,3-pentadiene
IP = isoprene
[2]Using DuPont's Model 990 DTA.

EXAMPLE III

A mixed (cis- plus trans-) 1,3-pentadiene fraction which had been separated from a by-product C$_5$-hydrocarbon stream contained 55% trans-1,3- and 41.4% cis-1,3-pentadiene, plus 1.5% cyclopentene and 2.0% of C$_5$-aliphatic and other olefinic hydrocarbons, according to a vapor phase chromatographic analysis. A purified premix containing a total of 100 grams of the 1,3-pentadiene isomers in hexane per liter of solution was prepared. An aliquot of this premix was polymerized for 30 minutes at 50° C. after injecting the catalyst components, using the "in situ" method, at concentrations of triethylaluminum:chromium naphthenate:dibutyl hydrogen phosphite=15:2:2 millimoles per hundred grams of monomers (mhm). The amount of solid polymer obtained was 99% of the theoretical yield. It had a DSV of 2.5 dl/g. Its number and weight average molecular weights were 148,000 and 437,000, respectively, as determined using a Waters Associates Model No. 200 gel permeation chromatograph. Its Tg was −46° C.

| Exp. No. | 1,3-pentadiene Cis | Trans | Catalyst, mhm R$_3$Al | | CrNaph | (RO)$_2$HPO | Pzn Time, Hours | Polymer Yield, Wt., % | DSV, dl/g | $T_g$,[2] °C. | % cis-1,4-PPD,[3] NMR + IR Anal % |
|---|---|---|---|---|---|---|---|---|---|---|---|
| 1 | 90 | 10 | 12 | Et[1] | 2 | 2 Bu | 2 | 87 | — | −59 | — |
|   |    |    | 12 | iBu   | 2 | 2 Oct | 17 | 100 | 4.4 | — | 82 |
|   |    |    | 10 | Hex   | 2 | 2 Oct | 1.5 | 100 | — | — | — |
|   |    |    | 7.5 | Hex  | 1.5 | 1.5 Bu | 17 | 69 | 2.8 | — | 81 |
| 2 | 75 | 25 | 10 | Hex   | 2 | 2 Bu | 17 | 100 | 2.6 | — | 77 |
|   |    |    | 15 | Et    | 2 | 2 Bu | 2 | 99 | — | −56 | — |
| 3 | 60 | 40 | 12 | Et    | 2 | 2 Bu | 2 | 94 | — | −53 | — |
| 4 | 50 | 50 | 15 | Et    | 2 | 2 Bu | 2 | 97 | — | −51 | — |
|   |    |    | 7.5 | Hex  | 1.5 | 1.5 Bu | 1.5 | 93 | 2.9 | — | — |
| 5 | 40 | 60 | 15 | Et    | 2 | 2 Bu | 2 | 97 | — | −51 | — |
| 6 | 30 | 70 | 12 | Et    | 2 | 2 Bu | 2 | 93 | — | −50 | — |
| 7 | 25 | 75 | 12 | Et    | 2 | 2 Bu | 1.5 | 93 | — | −47 | 77° |
| 8 | 20 | 80 | 12 | Et    | 2 | 2 Bu | 2 | 94 | — | −47 | — |

[1]Et, i-Bu, Hex, Bu and Oct in columns 4 and 6 represent ethyl, isobutyl, hexyl, n-butyl and octyl, respectively.
[2]Using Dupont's Model 900 DTA
[3]PPD = polypentadiene; the polymers also contained 13–17% trans-1,4- and 5–7% 3,4-polypentadienes.

The microstructure of the polymer was approximately 78% cis-1,4-, 14% trans-1,2- and 8% 3,4-polypentadiene.

EXAMPLE IV

A purified premix containing 100 grams/liter of mixed 1,3-pentadienes (50.4% trans- and 45.8% cis-) in hexane was polymerized at 50° C. at the conditions listed in the table below, using the procedure that was outlined in Example I.

| Exp. No. | Hex$_3$Al | CrNaph | (Oct O)$_2$HPO | Time, Hours | Yield, Wt. % | DSV, dl/g | Tg, °C. |
|---|---|---|---|---|---|---|---|
| 1 | 7.5 | 1.5 | 1.5 | 1.5 | 97 | 3.7 | −48 |
| 2 | 6.0 | 1.2 | 1.2 | 1.5 | 98 | 4.0 | −50 |

While certain representative embodiments and details have been shown for the purpose of illustrating the invention, it will be apparent to those skilled in this art that various changes and modifications may be made therein without departing from the spirit or scope of the invention.

We claim:

1. A process comprising the copolymerization of cis-1,3-pentadiene and trans-1,3-pentadiene to produce predominantly cis 1,4-polypentadiene by subjecting said diolefins to a catalyst comprising (A) at least one soluble chromium compound selected from the group consisting of chromium salts of organic acids containing from 2 to 20 carbon atoms, organic complex compounds of chromium containing tridentate ligands and π-bonded organo chromium compounds, (B) at least one organometallic compound selected from the group consisting of aluminum trialkyls, magnesium dialkyls and zinc dialkyls, and (C) at least one phosphite compound selected from tris (2-chloroethyl)phosphite and dialkyl hydrogen phosphites, which contain 1 to 20 carbon atoms in the alkyl groups and in which the molar ratio of the organometallic compound to the chromium compound (Me/Cr) ranges from about 20/1 to about 2/1 and the phosphite member to the chromium compound (P/Cr) ranges from about 0.2/1 to about 10/1.

2. A process comprising the copolymerization of cis-1,3-pentadiene with at least one diolefin selected from the group consisting of butadiene, 2-ethyl-1,3-butadiene, 2-methyl-1,3-pentadiene, and isoprene to form elastomeric copolymers by subjecting said diolefins to a catalyst comprising (A) at least one soluble chromium compound selected from the group consisting of chromium salts of organic acids containing from 2 to 20 carbon atoms, organic complex compounds of chromium containing tridentate ligands and π-bonded organo chromium compounds, (B) at least one organometallic compound selected from the group consisting of aluminum trialkyls, magnesium dialkyls and zinc dialkyls, and (C) at least one phosphite compound selected from tris(2-chloroethyl) phosphite, dialkyl hydrogen phosphites and diaryl hydrogen phosphites, which contain 1 to 20 carbon atoms in the alkyl groups and in which the molar ratio of the organometallic compound to the chromium compound (Me/Cr) ranges from about 20/1 to about 2/1 and the phosphite member to the chromium compound (P/Cr) ranges from about 0.2/1 to about 10/1.

3. A process according to claims 1 or 2 wherein the organometallic compound is a trialkyl aluminum in which the alkyl groups contain at least 2 and not more than 6 carbon atoms.

4. A process according to claims 1 or 2 wherein the soluble chromium compound is selected from the group consisting of chromium salts of carboxylic acids and chromium acetylacetonate.

5. A process according to claims 1 or 2 in which the soluble chromium compound is selected from the group consisting of chromium decanoate, chromium naphthenate and chromium octanoate.

6. A process according to claims 1 or 2 in which the phosphite member is selected from the group consisting of diethylhydrogen phosphite, diisopropyl hydrogen phosphite, dibutyl hydrogen phosphite, dihexyl hydrogen phosphite and dioctyl hydrogen phosphite.

7. A process according to claims 1 or 2 in which the molar ratio of the organometallic compound to the chromium compound (Me/Cr) ranges from about 8/1 to about 4/1 and the phosphite member to the chromium compound (P/Cr) ranges from about 0.5/1 to about 3/1.

8. A process according to claims 1 or 2 wherein the organometallic compound is a trialkylaluminum wherein each alkyl group contains at least 2 and not more than 6 carbon atoms, the soluble chromium compound is selected from the group consisting of chromium salts of carboxylic acids and chromium acetylacetonate and the phosphite compound is a dialkyl hydrogen phosphite in which the mole ratio of the organometallic compound to the chromium compound is about 4/1 to about 8/1 and the phosphite compound to the chromium compound is from about 0.5/1 to about 3/1.

9. A process according to claim 8 where the monomers copolymerized are cis-1,3- and trans-1,3-pentadiene and where the copolymer produced is a moderately stereoregular elastomer having a microstructure containing at least 70 percent cis-1,4-polypentadiene.

10. A process according to claim 2 wherein cis-1,3-pentadiene and isoprene are copolymerized to produce amorphous, elastomeric copolymers.

* * * * *